(12) United States Patent
Schuetzle et al.

(10) Patent No.: US 11,807,823 B2
(45) Date of Patent: *Nov. 7, 2023

(54) BLENDS OF LOW CARBON AND CONVENTIONAL FUELS WITH IMPROVED PERFORMANCE CHARACTERISTICS

(71) Applicant: Fuel Blending Solutions, LLC, Sacramento, CA (US)

(72) Inventors: Robert Schuetzle, Sacramento, CA (US); Dennis Schuetzle, Grass Valley, CA (US)

(73) Assignee: Platinum Fuels, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/803,254

(22) Filed: Apr. 4, 2022

(65) Prior Publication Data

US 2022/0235286 A1    Jul. 28, 2022

Related U.S. Application Data

(63) Continuation of application No. 16/873,107, filed on Jan. 31, 2020, now Pat. No. 11,345,868, which is a
(Continued)

(51) Int. Cl.
*C10L 1/08* (2006.01)
*C10L 1/02* (2006.01)
(Continued)

(52) U.S. Cl.
CPC ........ *C10L 1/08* (2013.01); *C01B 3/34* (2013.01); *C10G 2/30* (2013.01); *C10G 3/00* (2013.01);
(Continued)

(58) Field of Classification Search
CPC ............ G11C 11/221; G11C 11/2253; G11C 11/2257; G11C 11/2259; G11C 11/2273;
(Continued)

(56) References Cited

U.S. PATENT DOCUMENTS

| | | | |
|---|---|---|---|
| 2004/0128905 A1* | 7/2004 | Clark | C10L 1/19 44/385 |
| 2004/0152930 A1* | 8/2004 | O'Rear | C10L 1/2222 585/1 |

(Continued)

OTHER PUBLICATIONS

"Alternative Fuels Data Center_ Renewable Hydrocarbon Biofuels"(date May 2015) (Year: 2015).*
(Continued)

*Primary Examiner* — Ellen M McAvoy
*Assistant Examiner* — Chantel L Graham
(74) *Attorney, Agent, or Firm* — McKinney Law Group APC; Jeffrey A. McKinney

(57) ABSTRACT

The present invention provides a blended fuel and methods for producing the blended fuel, wherein a low carbon fuel derived from a renewable resource such as biomass, is blended with a traditional, petroleum derived fuel. A blended fuel which includes greater than 10% by volume of low carbon fuel has an overall improved lifecycle greenhouse gas content of about 5% or more compared to the petroleum derived fuel. Also, blending of the low carbon fuel to the traditional, petroleum fuel improves various engine performance characteristics of the traditional fuel.

18 Claims, 4 Drawing Sheets

Related U.S. Application Data continuation of application No. 15/330,621, filed on Oct. 18, 2016, now Pat. No. 10,590,355, which is a continuation of application No. 14/120,284, filed on May 14, 2014, now Pat. No. 9,476,002, which is a continuation of application No. 12/928,997, filed on Dec. 23, 2010, now Pat. No. 8,741,001.

(51) Int. Cl.
*C10L 1/04* (2006.01)
*C10K 3/00* (2006.01)
*C01B 3/34* (2006.01)
*C10G 2/00* (2006.01)
*C10G 3/00* (2006.01)
*C10J 3/82* (2006.01)

(52) U.S. Cl.
CPC ............ *C10J 3/82* (2013.01); *C10K 3/006* (2013.01); *C10L 1/02* (2013.01); *C10L 1/04* (2013.01); *C01B 2203/0216* (2013.01); *C01B 2203/0233* (2013.01); *C01B 2203/0244* (2013.01); *C01B 2203/04* (2013.01); *C01B 2203/048* (2013.01); *C01B 2203/0485* (2013.01); *C01B 2203/061* (2013.01); *C01B 2203/062* (2013.01); *C10L 2200/0492* (2013.01); *C10L 2290/04* (2013.01); *C10L 2290/24* (2013.01); *C10L 2290/42* (2013.01); *Y02E 10/00* (2013.01); *Y02E 10/20* (2013.01); *Y02E 50/00* (2013.01); *Y02E 50/10* (2013.01); *Y02E 50/30* (2013.01); *Y02E 60/00* (2013.01); *Y02E 70/00* (2013.01); *Y02P 20/145* (2015.11); *Y02P 30/00* (2015.11); *Y02P 30/20* (2015.11)

(58) Field of Classification Search
CPC ............ G11C 11/2275; G11C 11/2297; G11C 2207/2227; C01B 2203/0216; C01B 2203/0233; C01B 2203/0244; C01B 2203/04; C01B 2203/048; C01B 2203/0485; C01B 2203/061; C01B 2203/062; C01B 3/34; C10G 2/30; C10G 3/00; C10J 3/82; C10K 3/006; C10L 1/02; C10L 1/04; C10L 1/08; C10L 2200/0492; C10L 2290/04; C10L 2290/24; C10L 2290/42; Y02E 10/00; Y02E 10/20; Y02E 50/00; Y02E 50/10; Y02E 50/30; Y02E 60/00; Y02E 70/00; Y02P 20/145; Y02P 30/00; Y02P 30/20
See application file for complete search history.

(56) References Cited

U.S. PATENT DOCUMENTS

| | | | |
|---|---|---|---|
| 2006/0006098 A1* | 1/2006 | Espinoza | C10G 63/04 208/950 |
| 2010/0279354 A1* | 11/2010 | de Crecy | C12P 7/6463 435/243 |
| 2011/0240288 A1* | 10/2011 | Kibby | C10G 2/332 166/267 |

OTHER PUBLICATIONS

U.S. Appl. No. 11/966,788, filed Jul. 15, 2010, Schuetzle, Dennis.
Burnham, A., "User Guide for the GREET Fleet Footprint Calculator 1.1," (2009) http://greet.es.anl.gov/publications.
Elgowainy, A., "Well-to-Wheels Energy Use and Greenhouse Gas Emissions Analysis of Plug-in-Hybrid Electric Vehicles," (2009) http://greet.es.anl.gov/publications.
Brinkman, et al., "Well-to-Wheels Analysis," (2005) http://1.eere.energy.gov.
Aatola,. Hannu, et al., "Hydrotreated Vegetable Oil (HVO) as a Renewable Diesel Fuel . . . ," SAE International Journal of Engines (2008) 1. 10.4271/2008-01-2500.
Alleman, T. & McCormich R., "Fischer-Tropsch Diesel Fuels—Properties and Exhaust Emissions . . . ," SAE Technical Paper Series (2003) 10.4271/2003-01-0763.

* cited by examiner

BLENDS OF LOW CARBON AND CONVENTIONAL FUELS WITH IMPROVED PERFORMANCE CHARACTERISTICS

This application is a continuation of U.S. patent application Ser. No. 16/873,107, filed on Jan. 31, 2020, which is a continuation of U.S. patent application Ser. No. 15/330,621, filed on Oct. 18, 2016, and issued as U.S. Pat. No. 10,590,355 on Mar. 17, 2020, which is a continuation of U.S. patent application Ser. No. 14/120,284, filed on May 14, 2014 and issued as U.S. Pat. No. 9,476,002 on Oct. 25, 2016, which is a continuation of U.S. patent application Ser. No. 12/928,997, filed on Dec. 23, 2010 and issued as U.S. Pat. No. 8,741,001 on Jun. 3, 2014, all of which are incorporated by reference for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention generally relates to blended fuels, where a low carbon fuel, ideally derived from a production process that uses a renewable, biomass feedstock, is blended with a traditional, petroleum derived fuel. Such blended fuels result in an overall improved well-to-wheels greenhouse gas content, as well as improved performance characteristics of the fuels, compared to the petroleum derived fuels.

2. Description of Related Art

Global demand for energy continues to rise at a significant rate, particularly among emerging industrialized nations. Biomass and other alternative carbon resources are becoming more attractive as renewable energy sources due to increasing energy costs as well as for environmental reasons.

Various types of fuels produce different amounts of greenhouse gases during their entire lifecycle (e.g., during fuel production, transportation, and consumption). Thus, these fuels have different impacts on the environment. One way to compare the greenhouse gas effect of each fuel is by calculating and comparing well-to-wheels greenhouse gas content to the well-to-wheels greenhouse gas content of a petroleum fuel (or "baseline" fuel).

A well-to-wheels greenhouse gas content ("WWGGC") refers to a calculation that is done using a greenhouse gas model, such as Argonne National Laboratories GREET model (currently in version 1.8d.1 which can be downloaded at http://greet.es.anl.gov/) or another similar greenhouse gas model. The model allows for the calculation of the amount of greenhouse gases that are produced throughout the entire lifecycle of the product (from "well to wheels"). The model takes into account, among other things, the production method, the feedstock used in the production, the type of fuel produced, transportation of the fuel to market, and the emissions produced from combustion of the fuel when it is used.

Petroleum derived fuels, such as gasoline and diesel fuel that are refined from oil using a traditional production method, produce a large amount of greenhouse gases. For example, diesel production from oil results in a well to well to wheels greenhouse gas production content of 383 $gCO_2e$/mi (all WWGGC scores referenced in this document are calculated using version 1.8d.1 of the GREET model which can be downloaded at http://greet.es.anl.gov/ and which provides archives of all older versions of the software). The units' $gCO_2e$/mi means the grams of carbon dioxide equivalent greenhouse gases that result from travelling one mile in a vehicle using the fuel. Other fuels, such as first generation biofuels (e.g., ethanol derived from corn), also score close to or greater than petroleum derived fuels in terms of WWGGC calculated according to the GREET model, thus providing no significant WWGGC benefit over petroleum fuels. For example, E85 (meaning 85% ethanol and 15% gasoline, where the ethanol is derived from corn) receives a WWGGC of 358 $gCO_2e$/mi.

Some of synthetic fuels that are produced from a biomass feedstock, using thermochemical or biochemical conversion processes, can achieve lifecycle greenhouse gas scores that are greater than 50% lower than traditional, petroleum derived fuels (e.g., a WWGGC score of lower than 191 using the GREET model). When comparisons are made, the same vehicle is used in the GREET model for comparison. While biofuels produced from existing known methods today may achieve an improved WWGGC compared to petroleum fuels, when blended with petroleum fuels, the engine performance characteristics of the blended fuels are sometimes reduced compared to the neat petroleum fuels. For example, blending such synthetic fuels with the petroleum fuel can reduce the engine performance characteristics of the petroleum fuel, such as a cetane number, lubricity, and increase emissions.

There is a need for an alternative fuel derived from a biomass feedstock, which when blended with a petroleum fuel, not only significantly improves WWGGC, but also improves the engine performance characteristics of the blended fuels. The present invention meets these needs as well as others and provides a substantial improvement over the prior art.

SUMMARY OF THE INVENTION

Embodiments of the invention provide a blended fuel which includes a petroleum fuel and a low carbon fuel produced from a renewable biomass feedstock, where the renewable biomass feedstock is converted into a low carbon fuel using a next generation process.

In embodiments of the invention, the low carbon fuel derived from a renewable feedstock has a well-to-wheels greenhouse content ("WWGGC") which is at least 50% lower than a WWGGC of the petroleum fuel when used in the same vehicle. When the low carbon fuel, in accordance with embodiments of the invention, is blended at least 10% by volume (with the rest of the balance from the petroleum fuel), the blended fuel has two or more performance characteristics (measurable by ASTM standards) which are improved compared to the 100% petroleum derived fuel. For instance, when a low carbon fuel diesel in accordance with the present invention and a petro diesel are blended, the blended fuel meets the ASTM D975 specification and has improved engine performance characteristics, such as better lubricity, higher cetane number, lower sulfur content, and/or enhanced oxidative stability, compared to the petroleum diesel fuel.

In one aspect of the invention, a blended fuel comprises about 5% to about 90%, by volume, of a petroleum fuel and about 95% to about 10%, by volume, of a low carbon fuel produced from a renewable biomass feedstock. The low carbon fuel is produced by a process where the renewable biomass feedstock is converted into syngas, and then the syngas is reacted with a catalyst to produce the low carbon fuel.

In one embodiment of the invention, the low carbon fuel has a well-to-wheels greenhouse gas content which is at least about 50% lower than a well-to-wheels greenhouse gas content of the petroleum fuel. The low carbon fuel also has at least two performance characteristic values measurable by ASTM tests which are at least about 40% improved compared to corresponding performance characteristic values of the petroleum fuel. The performance characteristic values include a cetane number, lubricity value, sulfur content, oxidative stability value, and others.

In another embodiment of the invention, the blended fuel has a well-to-wheels greenhouse gas content which is at least 5% lower than the well-to-wheels greenhouse gas content of the petroleum fuel. The blended fuel also has at least two performance characteristic values measurable by ASTM tests which are at least about 5% improved than the corresponding performance characteristic values of the petroleum fuel.

In another aspect of the invention, a process for producing a blended fuel is provided. The process includes converting a renewable biomass (such as forest residues, agricultural wastes, other) feedstock into a syngas and reacting the syngas with a catalyst to produce a low carbon fuel. About 5% to 90%, by volume, of a petroleum fuel and about 10% to about 95%, by volume, of a low carbon fuel (total 100% volume) are blended together.

In one embodiment, the low carbon fuel has a cetane number of greater than about 65. In another embodiment, the low carbon fuel has a lubricity value which is less than about 450 microns by HFRR at 60° C. (scar) measured by ASTM D 6079.

In yet another embodiment, the blended fuel has a cetane number that is greater than 5% or higher than the neat petroleum fuel. In yet another embodiment, the blended fuel has a lubricity value which is less than about 450 microns by HFRR at 60° C. (scar) measured by ASTM D 6079. In some embodiments, the blended fuel has a lubricity value which is less than about 400 microns or less than 350 microns by HFRR at 60° C. (scar) measured by ASTM D 6079.

Other objects, features, and advantages of the present invention will become apparent upon consideration of the following detailed description and the accompanying drawings.

DETAILED DESCRIPTION

Figure 1:
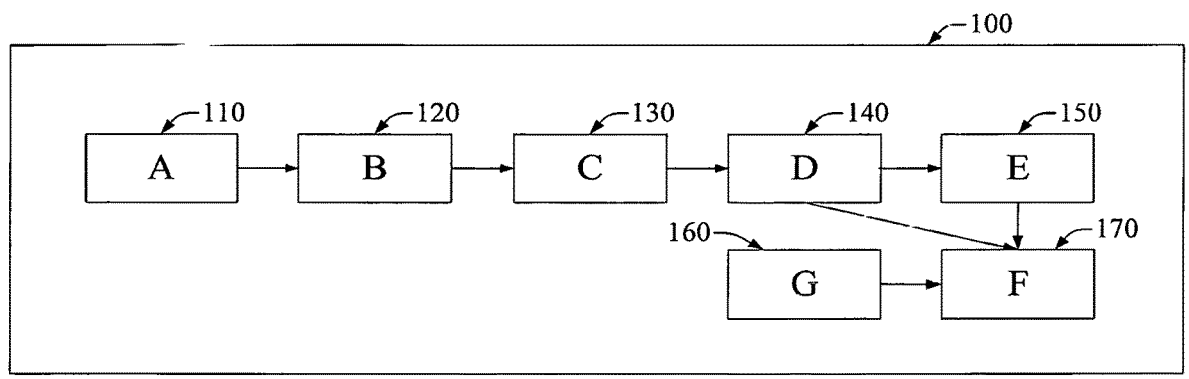
FIG. 1 (100) shows a schematic diagram of a process for making a blended fuel comprising a petroleum fuel and a low carbon fuel produced from a renewable biomass feedstock.

Embodiments of the invention provide a blended fuel and a method for making the blended fuel, where the blended fuel comprises a petroleum fuel blended with at least 10%, by volume, of a low carbon fuel derived from a renewable biomass feedstock. The low carbon fuel in accordance with embodiments of the invention has a well-to-wheels greenhouse gas content ("WWGGC") which is at least about 50% lower than a well-to-wheels greenhouse gas content of the petroleum fuel.

Furthermore, when a low carbon fuel in accordance with embodiments of the invention is blended with a petroleum fuel, the low carbon fuel improves one or more performance characteristics described in the corresponding ASTM specification for the fuel when compared to the petroleum fuel. The improved performance characteristics include, for example, cetane number, lubricity, oxidative stability, and reduced sulfur content. In addition, tailpipe emissions of nitrogen oxides, carbon monoxide, hydrocarbons and particulates may be reduced.

A number of performance characteristics of a fuel can be measured by standard test methods, such as various ASTM standard tests. For example, for a diesel fuel, a cetane number of the fuel can be tested by a standard test method ASTM D613. The cetane number provides a measure of the ignition characteristics of diesel fuel oil in compression ignition engines. This test method covers the determination of the rating of diesel fuel oil in terms of an arbitrary scale of cetane numbers using a single cylinder, four-stroke cycle, variable compression ratio, and indirect injected diesel engine. The cetane number scale covers the range from zero to 100.

In embodiments of the invention, a low carbon fuel has a cetane number in the range of 65 to 80 or higher.

Lubricity refers to the ability of a fluid to minimize the degree of friction between surfaces in relative motion under load conditions. A lubricity value of a fuel can be measured by a standard test method, such as ASTM D6079 or D6751. ASTM D6079 is a standard test method for evaluating lubricity of diesel fuels by the high-frequency reciprocating rig (HFRR). The wear scar generated in the HFRR test is sensitive to contamination of the fluids, test materials, and the temperature of the test. It is measured in terms of a diameter of wear scar in microns.

In embodiments of the invention, a low carbon fuel has a HFRR lubricity value of less than about 500 microns. More typically, a low carbon fuel in accordance with the present invention has a HFRR lubricity value in the range from 200-450 microns.

The sulfur content of a fuel can be measured by various standard test methods, such as ASTM D5453. As of September 2007, most on-highway diesel fuel sold at retail locations in the United States is ultra-low sulfur diesel with an allowable sulfur content of 15 ppm.

In embodiments of the invention, a low carbon fuel has sulfur content of less than 5 ppm.

The oxidative stability value can be measured by standard test methods, such as ASTM D2274-10. This test method provides a basis for the determination of the storage stability of middle distillate such as No. 2 fuel oil. A fuel is tested under specified oxidizing conditions at 95° C.

In embodiments of the invention, a low carbon fuel has an oxidative stability value that is greater than 5% improved over traditional petroleum derived fuels.

All of these and other suitable ASTM standards can be adopted to test performance characteristics of fuels in accordance with embodiments of the invention. These and other ASTM standard test methods are hereby incorporated by reference in their entirety.

The performance characteristics (e.g., measured by ASTM tests) of a low carbon fuel in accordance with the present invention are 5-90% better than the corresponding performance characteristic values of a petroleum fuel which is to be blended with the low carbon fuel. By "better" or "improved," a specific performance characteristic value (e.g., cetane number) of a low carbon fuel can be higher or lower than the corresponding value for a petroleum fuel.

For example, if a petro diesel has a cetane number of 50 and a low carbon diesel fuel in accordance with the present invention has a cetane number of 70, then the cetane number of the low carbon fuel is 40% better or improved compared to the cetane number of the petroleum fuel.

In another example, if a petro diesel has a lubricity value of 530 microns in wear scar and a low carbon diesel fuel in accordance with the present invention has a lubricity value of 300 microns, then the lubricity value (in terms of wear scar diameter) of the lower carbon blend is considered 43% better or improved, compared to the lubricity value of the petro diesel.

When a low carbon fuel in accordance with the present invention is blended with a petroleum fuel, blending improves at least two performance characteristics of a blended fuel by at least 5%, 10%, 15%, 20%, 30%, 40%, 50% or more, compared to the corresponding performance characteristics of the petroleum fuel.

For example, if a blended fuel is a diesel fuel (e.g., a petro diesel combined with a low carbon fuel comprising C8+ fraction), the corresponding ASTM D975 specification includes performance characteristics such as lubricity, cetane, sulfur content, oxidative stability, and others. In embodiments of the invention, blending of a low carbon diesel fuel with a petro diesel improve two or more of performance characteristics of ASTM D975. For example, if a petro diesel has a cetane number of 50 and a low carbon diesel in accordance with the present invention has a cetane number of 70, a 15% blend (i.e., 15% low carbon diesel and 85% petro diesel) has a cetane number of 53, which is 6% better or improved compared to the cetane number of the petro diesel.

As used herein, the terms "a petroleum derived fuel" or "petroleum fuel" refers to a fuel derived from a fraction or fractions of a petroleum crude oil.

The term "diesel fuel" refers to any liquid fuel used in diesel engines. A diesel fuel includes a mixture of carbon chains that typically contain between 8 to 24 carbon atoms per molecule. A conventional diesel fuel is a petroleum derived diesel fuel or petro diesel which is a distillate from crude oil obtained by collecting a fraction boiling at atmospheric pressure over an approximate temperature range of 200° C. to 350° C. degrees. A diesel fuel may also include a synthetic diesel derived from alternative sources (e.g., renewable biomass).

The term "renewable biomass feedstock" refers to any organic matter that is available on a renewable or recurring basis, including renewable plant materials (feed grains, other agricultural commodities, other plants and trees, algae), waste material (crop residue, other vegetative waste material including wood waste and wood residue), animal waste and byproducts (fats, oils, greases, and manure), construction waste, and food waste/yard waste. The term "renewable biomass feedstock" refers to any of the above materials and excludes those obtained from petroleum crude oil.

The term "well-to-wheels greenhouse gas content" refers to a calculation that is done using a greenhouse gas model, such as Argonne National Laboratories GREET ("Greenhouse gases, Regulated Emissions, and Energy Use in Transportation") model or another similar greenhouse gas model, that allows for the calculation of the amount of greenhouse gases that are produced throughout the entire lifecycle of the product (from "well to wheels"). The model takes into account among other things the production method, the feedstock used in the production, the type of fuel produced, transportation of the fuel to market, and the emissions produced from combustion of the fuel when it is used.

The most recent version of GREET includes more than 100 fuel pathways including petroleum fuels, natural gas fuels, biofuels, hydrogen and electricity produced from various energy feedstock sources. The most recent versions of GREET model (GREET 1.8d1 for fuel-cycle model and GREET 2.7 for vehicle-cycle model which calculates the life-cycle energy use emissions for vehicle production) is available at http://greet.es.anl.gov/. The software for calculating WWGGC is readily available and can be downloaded by the public. The GREET model can be used to calculate the energy use and greenhouse gas (GHG) emissions associated with the production and use of a particular type of fuel.

The WWGGC calculations include two parts. First, a well-to-tank (WTT) life cycle analysis of a petroleum based fuel pathway includes all steps from crude oil recovery to final finished fuel. Second, a tank-to-wheel (TTW) analysis includes actual combustion of fuel in a motor vehicle for motive power. The WTT and TTW analyses are combined to provide a total well-to-wheel (WTW) analysis, which provides a calculation for a well-to-wheel greenhouse gas content ("WWGGC"). The WWGGC units may be expressed in $CO_2$ equivalents per any convenient energy unit as long as the same units are used throughout the life cycle analysis. The WWGGC units may be expressed in $CO_2$ equivalents per any convenient energy unit as long as the same units are used throughout the life cycle analysis.

Thus, using the GREET or other models for calculating WWGGC, a WWGGC score of a particular fuel can be compared with a petroleum derived fuel such as gasoline or petro diesel. The lower the WWGGC, the lower the amount of greenhouse gas a particular fuel produces during its lifecycle. For example, diesel production from oil results in a well to well to wheels greenhouse gas production content of 383 $gCO_2e$/mi (all WWGGC scores referenced in this document are calculated using version 1.8d.1 of the GREET model). The units' $gCO_2e$/mi means the grams of carbon dioxide equivalent greenhouse gases that result from travelling one mile in a vehicle using the fuel. Gasoline when derived from petroleum receives a score of 447 $gCO_2e$/mi. Biomass derived diesel fuels using processes described herein, receive a score of about 49 $gCO_2e$/mi (or 87% less than petro diesel when used in the same vehicle type). The actual score for the biomass derived fuels will depend on modifications to the GREET model that relate to the actual process used in the production of the fuel as well as other variables, for example the project location, type of feedstock used, and technical information related to the actual process used.

The term "a low carbon fuel" refers to a fuel derived from a renewable biomass feedstock with a WWGGC which is at least about 50% less than a WWGGC of a petroleum fuel or a petroleum baseline. In some embodiments, a low carbon fuel can have a WWGGC which about 60%, 70%, 80%, or 90% less than the petroleum baseline. A low carbon fuel may be in any suitable form, such as a diesel fuel, gasoline, kerosene, aviation fuel, and others.

Fuels derived from biomass do not necessarily have a lower WWGGC compared to the petroleum baseline. First generation biofuels, such as ethanol derived from corn or other feedstocks, also typically score close to or greater than their petroleum derived counterparts. For example, E85 (meaning 85% ethanol and 15% gasoline, where the ethanol is derived from corn) receives a WWGGC of 358 $gCO_2e$/mi.

While renewable fuels, such as biodiesel and bioethanol, can provide some benefit in reducing WWGGC when these fuels are blended with conventional petroleum fuels, these renewable fuels can negatively impact their engine performance characteristics. For example, blending of bioethanol with traditional diesel fuel, lowers the cetane number of a diesel fuel, negatively impacting its engine combustion quality. Even when blended at 20% ethanol, the cetane number of the diesel fuel barely meets engine performance specifications.

Furthermore, biodiesel which typically has a cetane number between 40 and 55 will either have no impact or a detrimental impact on cetane number.

In embodiments of the invention, renewable biomass feedstocks are processed in a suitable system to produce a unique synthetic, low carbon fuels. In certain embodiments, low carbon fuels are diesel fuels from waste biomass. Low carbon fuels according to the invention provide a major improvement in WWGGC over the petroleum fuel baseline and also provide an improvement in various performance characteristics, such as cetane number, lubricity and/or reduced tailpipe emissions.

Biomass or other renewable resources can be converted into liquid fuels using biochemical or thermochemical approaches.

Using thermochemical conversion processes, biomass or other renewable resources can be converted into syngas using gasification, pyrolysis/steam reforming, and other methods. After conversion to syngas, the syngas can be catalytically converted into a wide variety of liquid fuels. Other thermochemical processes include the production of liquid fuels from pyrolysis oils, hydroprocessing of waste animal fats, and other thermochemical processes.

Using biochemical conversion processes, biomass or other renewable resources can be converted to sugars using various enzymes. After conversion to sugars, the sugars can be converted to ethanol or other fuels, chemicals, or intermediaries using conventional microorganism fermentation processes, or possibly to other fuels, chemicals or intermediaries using modified microorganism strains.

In one embodiment, a blended fuel may include a synthetic fuel which is a low carbon fuel derived from biomass derived sugars. The process uses an engineered yeast to convert sugar to isoprenoids. These intermediary isoprenoids are then processed into final fuel products that are used as a blendstock.

In one embodiment, a blended fuel may include a synthetic diesel fuel which is a low carbon fuel derived from a renewable biomass feedstock and a petro diesel. In another embodiment, a synthetic diesel fuel is a non-ester, renewable diesel fuel. Such blended fuels may meet the standards and specifications detailed in ASTM D975, which is the same standards and specifications for petro diesel fuels. Contrary to a synthetic diesel in accordance with the present invention, a biodiesel (i.e., a fuel comprised of mono-alkyl esters of long chain fatty acids derived from vegetable oils or animal fats) and its blends must meet the specifications of a different standard, ASTM D 6751.

In another embodiment, the blended fuel may include a low carbon fuel which is comprised of a non-ethanol or non-alcohol hydrocarbon fuel.

Embodiments of the invention provide for a number of advantages. For example, blending a low carbon fuel according to the present invention with a petroleum fuel reduces the world's dependence on fossil fuels produced from petroleum crude oil. A low carbon diesel fuel and its blend according to the present invention has a lower WWGGC and produces less greenhouse gas emissions during the production and consumption of the fuel. Furthermore, by blending a low carbon diesel fuel to a traditional petroleum derived diesel fuel, the performance characteristics of the blended fuels in accordance with the present invention, such as lubricity and cetane number, are improved compared to the traditional petroleum derived fuel.

Examples of embodiments of the invention are illustrated using figures and are described below. The figures described herein are used to illustrate embodiments of the invention, and are not in any way intended to limit the scope of the invention.

Referring more specifically to the drawings, FIG. 1 illustrates a schematic flow diagram, starting from the production of syngas from a renewable biomass feedstock (in Block A) to the blending of a low carbon fuel produced from the syngas with a petroleum fuel (in Block F).

A. Syngas Production

In FIG. 1, block A (110) refers to any process that produces syngas. Syngas can be generated from a wide variety of renewable biomass sources. These include, for example, cellulosic waste materials such as agricultural wastes, vegetative wood waste, energy crops, tree trimmings, and others. A suitable syngas generator can be used to thermally convert a carbonaceous feedstock to syngas. Examples of syngas generators and systems include pyrolyzers, gasifiers, steam or hydro-gasification systems, steam reformers, autothermal reformers or combinations of these technologies. Syngas can also be generated from reforming biogas, $CO_2$, and other renewable gas resources.

Any suitable system and apparatus can be used to generate syngas from renewable biomass feedstocks and to catalytically convert the syngas to a low carbon fuel. In one embodiment, an integrated system can be used where the system is configured to generate liquid fuels, electricity, and heat from carbonaceous feedstocks. Such a system is described in copending U.S. patent application Ser. No. 11/966,788, filed on Dec. 28, 2007 (published as US2010/0175320), which is incorporated herein by reference in its entirety.

In the integrated system described in copending U.S. patent application Ser. No. 11/966,788, the process for producing syngas and subsequent liquid fuels are optimized by using an on-line computer system with the use of one or more continuous gas analyzers to measure gas concentrations and process algorithms to control and maximize product use and energy efficiency. The characteristics of syngas can be analyzed by gas analyzers (e.g., mass spectrometer) and the carbon monoxide and hydrogen ratios can be adjusted by varying operating conditions of the syngas production process. The gas analyzers can measure concentrations of various gas species, such as oxygen, nitrogen, hydrogen, carbon monoxide, and others.

In some embodiments, the system can convert a renewable biomass feedstock to syngas, where the conversion system uses steam reforming in the absence of oxygen or air to produce syngas. Excluding oxygen and air from the pyrolyzer or steam reformer can significantly decrease contaminants typically found in the syngas (which may include hydrogen sulfide, ammonia, chlorides, or particulates) that reduce catalyst lifetime. Ideally, the oxygen concentration in the conversion system is no more than 0.05 Mole percent. System temperature and pressure can be altered to limit the levels of oxygen or air in the system. For example, if the oxygen level is greater than 0.5 Mole percent, the system pressure and temperature are altered to reduce the oxygen level. The higher system pressures also limit the air entrained in biomass feedstock or other feed stream from entering the system.

Other suitable systems may also be used in the production of syngas from renewable biomass feedstocks.

B. Syngas Cleanup and Conditioning

In FIG. 1, block B (120) represents syngas cleanup and conditioning processes. Clean syngas, free of impurities (which may affect catalyst performance and lifetime), allows for an efficient and economical operation. Impurities may include hydrogen sulfide, ammonia, chlorides, and other contaminants that result from a syngas production process. Syngas cleanup processes are well known and described in the art. For example, syngas cleanup processes may include sulfur clean up catalysts, particulate filters, catalytic reformation using catalysts (including nickel based catalysts), tar cracking, and other technologies to produce clean syngas for subsequent conversion to fuels or chemicals. In certain embodiments, syngas cleanup and conditioning processes may be included in the syngas generation system.

C. Catalytically Reacting Syngas to Produce Hydrocarbon Products

In FIG. 1, block C (130) represents conversion of syngas into various products. For instance, a clean syngas stream (e.g., CO, $H_2$, $CH_4$, $CO_2$ and $H_2O$ at varying concentrations) is introduced to a catalytic reactor to generate liquid fuels from CO and $H_2$ among other products. The catalytic hydrogenation of carbon monoxide produce light gases, liquids and waxes, ranging from methane to heavy hydrocarbons ($C_{25}$ and higher) in addition to oxygenated hydrocarbons. This process is typically referred to as Fischer-Tropsch synthesis. The Fischer-Tropsch synthesis is used to produce distillate fuels (e.g., gasoline, diesel, aviation fuel, and others) or specialty chemicals (e.g. higher alcohols, paraffins, olefins, and others) from syngas.

In Fischer-Tropsch synthesis, the hydrocarbon product selectivity depends on diffusion, reaction, and convection processes occurring within the catalyst pellets (i.e., supported catalyst) and reactor. In embodiments of the invention, catalyst support or pellets can have any suitable shapes. For example, the catalyst shape may be an extrudate with a lobed (e.g., tri-lobes, quad-lobes, and others), fluted, or vaned cross section but can be a sphere, granule, powder, or other support that allows efficient operation. For lobed supports, the effective pellet radius (i.e., the minimum distance between the mid-point and the outer surface portion of the pellet) may be about 600 microns or less, or about 300 microns or less.

In certain embodiments, the catalyst support material may be porous, and the mean pore diameter of the support material may be greater than about 100 angstroms, and in some instances, greater than about 120 angstroms. The catalyst support ideally has a crush strength of between about 3 lbs/mm and 4 lbs/mm and a BET surface area of greater than about 150 $m^2/g$. By contrast, conventional high surface area supports typically have an average pore diameter of less than 100 angstroms.

Supports that have a large average pore volume greater than about 120 angstroms generally have a surface area much lower than 150 $m^2/g$ and a crush strength below 2 lbs/mm despite additional calcination or heat treatment. In embodiments of the invention, this can be achieved with the addition of a structural stabilizer that provides additional crystallinity (for example silicon or silica oxide). This provides more strength upon heat treatment.

Any suitable material can be used as a support material in the Fischer-Tropsch process. These include metal oxides, such as alumina, silica, zirconia, magnesium, or combinations of these materials. Preferably, alumina is used as a support material to make a supported catalyst.

The catalytically active metals, which are included with or dispersed to the support material, include substances which promote the production of hydrocarbon fuel in the Fischer-Tropsch reaction. For example, these metals include cobalt, iron, nickel, or any combinations thereof. Various promoters may be also added to the support material. Examples of promoters include ruthenium, palladium, platinum, gold, nickel, rhenium, or any combinations thereof. The active metal distribution or dispersion on the support is ideally between about 2% and about 10%, preferably about 4%.

In one embodiment, a supported catalyst includes cobalt, iron, or nickel deposited at between about 5 weight % and 30 weight % on gamma alumina, more typically about 20 weight % on gamma alumina, based on the total weight of the supported catalyst. Also, the supported catalyst formulation includes selected combinations of one or more promoters consisting of ruthenium, palladium, platinum, gold nickel, rhenium, and combinations in about 0.01-2.0 weight % range, more typically in about 0.1-0.5 weight % range per promoter. Production methods of the catalyst include impregnation and other methods of production commonly used in the industry and are described in the art.

In embodiments of the invention, a low temperature, in-situ reduction procedures are used to prepare catalysts. In one embodiment, the catalyst is reduced in-situ in the multi-tubular fixed bed reactor at temperatures below 550° F. Typical Fischer-Tropsch catalysts are reduced ex-situ (before loading into the reactor) and at temperatures above 600° F., and can be as high as 400° C. (750° F.).

In one embodiment, a syngas stream is reacted with a supported catalyst under specific operating conditions to produce a product stream comprising light gases, diesel fuel and a wax, where a ratio of the diesel fuel to wax in the product stream between about 5:1 to about 30:1 by weight. Typically, the ratio of the diesel fuel to wax in the product stream is at least about 8:1. In this catalytic reaction, the pressures are typically kept below about 250 psi, more typically around 200 psi. The reaction is also operated at temperatures between about 350° F. and 460° F., more typically around 410° F.

Other details of catalysts and operating conditions for converting syngas into hydrocarbon products are described in application Ser. No. 12/927,242 filed Nov. 10, 2010, entitled "Catalytic Process for the Direct Production of Hydrocarbon Fuels from Syngas," which is herein incorporated by reference in its entirety.

D. Hydrocarbon Fuel Separation and Upgrading Processes

In FIG. 1, block D (140) includes product separation processes whereby a liquid fuel (e.g., a low carbon diesel fuel) is separated from other products. For example, liquid and wax products are condensed out of a product gas stream and the light gases are recycled back to the catalytic reactor and/or may be used for power production or other parasitic load requirements. Block D may also include condensing out the product gas stream into a product mixture comprising a low carbon fuel (e.g., diesel derived from renewable biomass feedstock), water, and wax in a single knock out vessel wherein the wax stays entrained in the water fraction for ease of separation from the low carbon fuel fraction.

The products produced from the process described in step C may be upgraded to produce a desired fuel fraction. Upgrading may be conducted on a liquid product (typically a C8-C24 fuel fraction), light gas fraction (typically a C4-C7 gas fraction), or a solid "wax" fraction (typically a C25+ solid wax fraction). Upgrading processes may include hydrocracking, hydroisomerization, distillation, thermal cracking, hydroprocessing, or other known and emerging upgrading processes.

E. Conditioning Step

In FIG. 1, block E (150) represents an optional step or steps to condition a low carbon fuel to further improve its properties. For example, a fuel product steam can be exposed to a platinum promoted mild isomerization catalyst under mild process conditions. This process step converts some n-paraffins in the $C_8$-$C_{24}$ fraction to iso-paraffins in order to improve cold flow properties of the fuel (e.g., a low carbon diesel fuel) which may be required in some market areas. Alternatively, in block E, a small percentage of a cold flow improver may be blended into the low carbon fuel fraction in order to help cold flow properties of the fuel for use in cold climates.

F. Blending a Low Carbon Fuel with a Petroleum Fuel

In block F (170) of FIG. 1, a petroleum fuel is blended with a low carbon fuel produced from a renewable biomass feedstock. The low carbon fuel separated in block D (140) (or from block E (150), if the low carbon fuel is further processed to improve its properties) may be blended from a petroleum fuel from block G (160). Any suitable amount of a low carbon fuel may be added to the petroleum fuel. For example, about 5% to about 90%, by volume, of a petroleum fuel may be mixed with about 95% to about 10%, by volume, of a low carbon fuel produced from a renewable biomass feedstock. Typically, at least about 5%, 10%, 15%, 20%, 25%, 30%, 40%, 50%, 60%, 70%, or 75% or more, by volume, of a low carbon fuel is blended with the rest of balance from the petroleum fuel. The mixing proportion of a low carbon fuel and a petroleum fuel may depend on various factors, including the level of WWGGC reduction or performance characteristics desired in the blended fuel (e.g., lubricity, cetane number, sulfur content, and others). In some instances, more than one type of low carbon fuels may be blended with a petroleum fuel. For example, a petroleum fuel may be blended with a mixture of low carbon diesel fuels derived from two or more different types of renewable sources. Blending methods may include splash blending, mixing, blending in fuel trucks, or other known and emerging methods.

Blended fuels according to embodiments of the invention have a number of performance characteristics measurable by ASTM tests which are superior compared to the corresponding characteristics of the petroleum fuel. For example, a blended fuel in accordance with embodiments of the invention may have a cetane number which is greater than about 55, 60, 65, 70, 75, or higher.

In another example, a blended fuel in accordance with the present invention can have a HFRR lubricity value of less than about 500 microns in wear scar diameter. In some instances, a HFRR lubricity value may be less than about 450 microns, 400 microns, 350 microns, 300 microns, 250 microns, 200 microns, or less.

In yet another example, a blended fuel in accordance with the present invention can have a sulfur content of less than 10 ppm, 5 ppm, 2 ppm, 1 ppm, 100 ppb, of or less.

To further illustrate embodiments of the present invention, the following examples are provided.

Example #1

In this example, a synthetic diesel fuel is produced from a renewable biomass feedstock. Agricultural wastes, including rice hulls, are used as a feed to a pyrolysis/steam reforming system to convert the feed into syngas. The system is operated in the absence of oxygen or air to produce syngas. The pyrolysis process is operated at 1450° F. and the biomass achieves a residence time of up to 20 minutes. Following pyrolysis, a steam reforming process is operated at 1800° F. and the pyrolysis products achieve a residence time of about 5 seconds or greater. Both pyrolysis and steam reforming are operated at a pressure of 30 psi.

The syngas feed is then introduced into a multi-tubular fixed bed reactor of a tube which includes supported catalysts. The catalyst bed is operated at a pressure of 400 psi and a temperature of 410° F.

The WWGGC of the synthetic diesel fuel is calculated according to the GREET model. The synthetic diesel fuel produced according to this example has a lifecycle greenhouse gas score (e.g., WWGGC) that is 89% lower than traditional, petroleum derived diesel fuel or approximately 42 $gCO_2e/mi$ (all WWGGC scores referenced in this document are calculated using version 1.8d.1 of the GREET model). The synthetic diesel fuel is blended at 15%, by volume, with the balance as petroleum derived diesel fuel. The resulting blend stock reduces the greenhouse gas score by 13.4% over petroleum derived diesel fuel alone.

In addition, the synthetic diesel fuel has a cetane number that is 76 (traditional California petroleum diesel fuels have a cetane number of about 45). The cetane number can be measured according to ASTM D-613 specification. The low carbon synthetic diesel fuel has a cetane number which is 68% higher than a cetane number of a traditional petroleum diesel fuel. When the low carbon synthetic diesel fuel is blended at 15%, by volume, with the rest of balance from a petroleum diesel fuel, the blended fuel has a cetane number which is at least 10% higher than the cetane number of the petroleum diesel fuel.

A lubricity value of a fuel is measured according to ASTM D 6079. The synthetic diesel fuel has a lubricity value of 360 (traditional California petroleum diesel fuels have a lubricity value of about 550). The synthetic diesel fuel has a lubricity value which is about 35% better than that of the California petroleum diesel fuel. When the low carbon synthetic diesel fuel is blended at 15%, by volume, with the rest of the balance from a petroleum diesel fuel, the blended fuel has a lubricity value which is at least 5% better than the petroleum diesel fuel.

Example #2

The synthetic diesel fuel produced in example #1 is blended in varying proportions with a California #2 diesel fuel (CA2), which is a low sulfur diesel fuel sold throughout California. The synthetic diesel fuel is blended at 25%, 50%, and 75%, by volume, with the rest of the balance from the CA2 fuel. The cetane numbers of various blends are measured according to ASTM D613.

Figure 2:
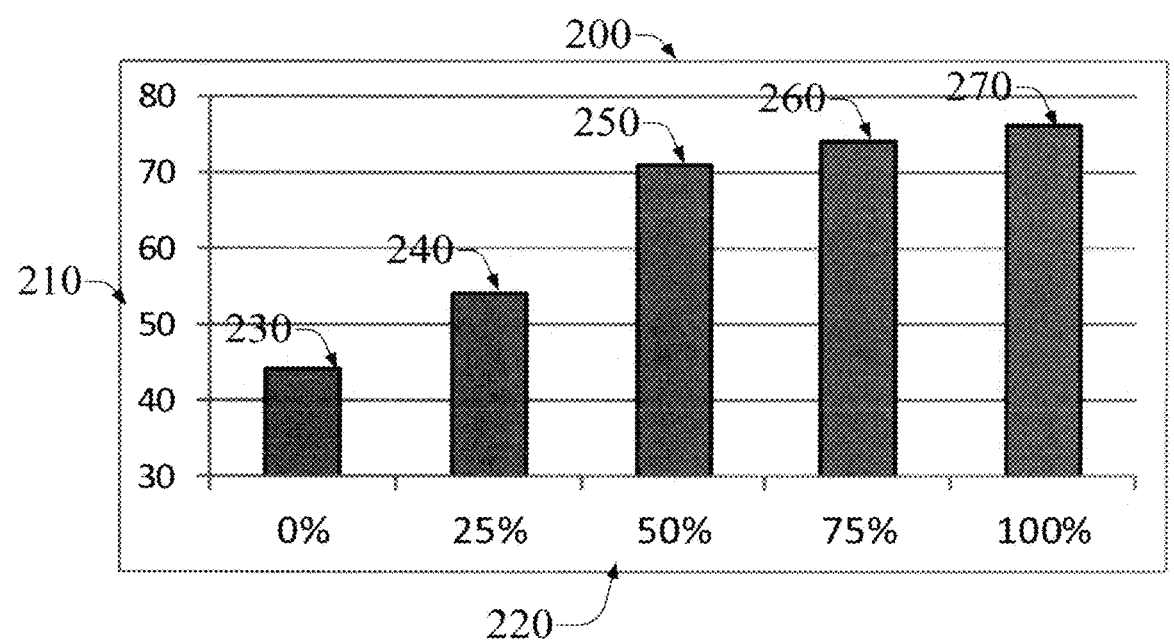
FIG. 2 (200) shows cetane numbers of blended fuels comprising varying proportions of a low carbon fuel derived from agricultural wastes and a traditional petroleum diesel fuel #2. The percent (%) of the low carbon fuel blended into petroleum fuel is shown (220) versus the cetane number (210). 100% petroleum fuel represented as California #2 diesel (and blended with no low carbon fuel) (230) has a cetane number of 44. When the low carbon fuel described herein is blended at 25% (with 75% petroleum fuel) the cetane number of the blended fuel is 54 (240). When the low carbon fuel described herein is blended at 50% (with 50% petroleum fuel) the cetane number of the blended fuel is 71 (250). When the low carbon fuel described herein is blended at 75% (with 25% petroleum fuel) the cetane number of the blended fuel is 74 (260) or close to the same level as the 100% low carbon fuel. At 100% low carbon fuel, the cetane number is 76 (270). It can be seen from the data above that blending of the low carbon diesel fuel described herein provides performance improvement benefits in excess of the improvement expected from the blend level.

As shown in FIG. 2, the 100% CA2 fuel has a cetane number of 44. The 100% synthetic diesel fuel has a cetane number of 76. When 75% (by volume) of synthetic diesel fuel is blended with 25% (by volume) of CA2 fuel, the cetane number of the blend is 74. When the synthetic diesel fuel and the CA2 fuel is blended in equal proportions by volume (i.e., 50%/50%), the cetane number is about 71 which is only slightly lower than the cetane number of 100% synthetic diesel fuel. When 25% (by volume) of synthetic diesel fuel is blended with 75% (by volume) of CA2 fuel, the cetane number of the blended fuel is 54.

The cetane number of the blend increases non-linearly as the proportion of the synthetic diesel fuel becomes higher in the blend. It is surprising to find that when 75% of the synthetic diesel fuel is blended with 25% of the CA2 fuel, the cetane number of the blend is close to the 100% synthetic diesel fuel as shown in FIG. 2.

Example #3

The low carbon synthetic diesel fuel produced in example #1 is blended in varying proportions with a CA2 fuel. The synthetic diesel fuel is blended at 25%, 50%, and 75%, by volume, with the rest of the balance from the CA2 fuel. The lubricity value of various blends was measured according to ASTM D 6079 which measures lubricity of diesel fuels by the high frequency reciprocating rig (HFRR).

Figure 3:
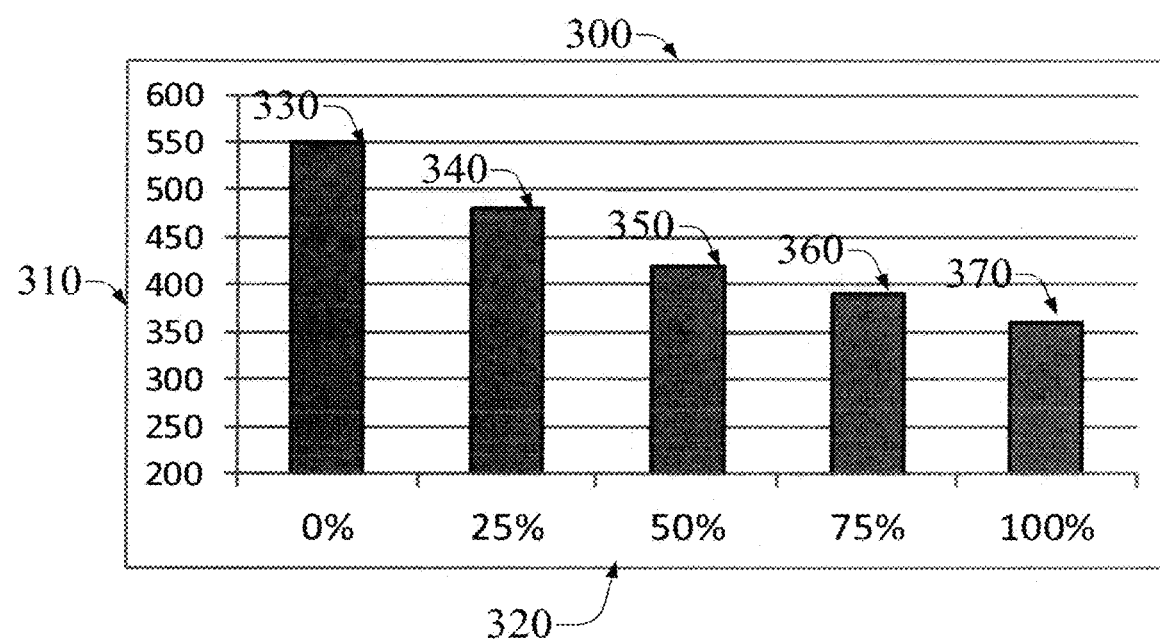
FIG. 3 (300) shows HFRR lubricity values (D 6079, wear scar micron) of blended fuels comprising varying proportions of a low carbon fuel derived from biomass residues with a traditional petroleum diesel (California #2 Fuel). The percent (%) of the low carbon fuel blended into petroleum fuel is shown (320) versus the HFRR lubricity values (310). 100% petroleum fuel represented as California #2 diesel (and blended with no low carbon fuel) (330) has a HFRR lubricity value of 550. When the low carbon fuel described herein is blended at 25% (with 75% petroleum fuel) the HFRR lubricity of the blended fuel is 480 (240). When the low carbon fuel described herein is blended at 50% (with 50% petroleum fuel) the HFRR lubricity of the blended fuel is 420 (250). When the low carbon fuel described herein is blended at 75% (with 25% petroleum fuel) the HFRR lubricity of the blended fuel is 390 (260) or close to the same level as the 100% low carbon fuel. At 100% low carbon fuel, the HFRR lubricity is 360 (270). It can be seen from the data above that blending of the low carbon diesel fuel described herein provides performance improvement benefits in excess of the improvement expected from the blend level.

As shown in FIG. 3, adding the synthetic diesel fuel to the CA2 fuel non-linearly impacts the lubricity value of the blended fuel. The 100% CA2 fuel had a HFRR wear scar diameter of about 550 microns, which is substantially higher than a HFRR wear scar diameter of the synthetic diesel fuel, which is about 360 microns. When the synthetic fuel is blended at 25% by volume with the CA2 fuel at 75% by volume, the lubricity value of the blended fuel is reduced to a HFRR wear scar diameter of about 480. Thus, blending 25% by volume of synthetic diesel fuel reduced the HFRR wear scar diameter by about 35%. When the synthetic fuel is blended at 50% by volume with the CA2 fuel at 50% by volume, the blended fuel has a HFRR wear scar diameter of about 420. When 25%, by volume, of the synthetic fuel is blended with 75%, by volume, of the CA2 fuel, the blended fuel has a HFRR wear diameter of about 390. Thus, blending greatly impacts the lubricity of the blended fuel when 25% of the synthetic fuel is added.

Comparative Example #3

Instead of using the synthetic diesel fuel produced in Example #1, a traditional biodiesel is blended with the CA2 fuel. The biodiesel is obtained by trans-esterification of fats or oils, such as soybean oils.

The biofuel is blended in varying proportions with the CA2 fuel. The synthetic diesel fuel is blended at 25%, 50%, and 75%, by volume, with the rest of the balance from the CA2 fuel. The lubricity values of various blends are measured according to ASTM D 6079 which measures lubricity of diesel fuels by the high frequency reciprocating rig (HFRR).

Figure 4:
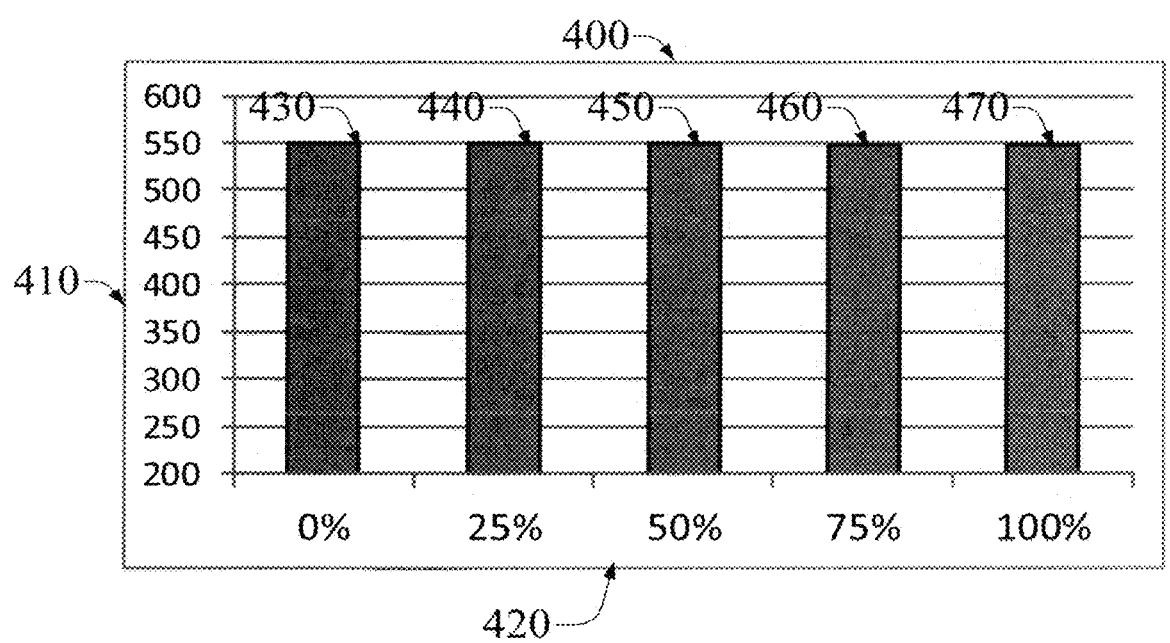
FIG. 4 (400) shows HFRR lubricity values (D 6079, wear scar micron) of blended fuels comprising varying proportions of a traditional biodiesel derived from vegetable oils with a traditional petroleum diesel fuel #2. The percent (%) of the biodiesel blended into petroleum fuel is shown (420) versus the HFRR lubricity values (410). 100% petroleum fuel represented as California #2 diesel (and blended with no biodiesel) (430) has a HFRR lubricity value of 550. When the biodiesel is blended at 25% (with 75% petroleum fuel) the HFRR lubricity of the blended fuel is still 550 (440). When the low carbon fuel described herein is blended at 50% (with 50% petroleum fuel) the HFRR lubricity of the blended fuel is 551 (450). When the low carbon fuel described herein is blended at 75% (with 25% petroleum fuel) the HFRR lubricity of the blended fuel is 547 (560) or close to the same level as the 100% low carbon fuel. At 100% low carbon fuel, the HFRR lubricity is 549 (570). It can be seen from the data above that blending of biodiesel provides no performance improvement. Similar results occur with other performance characteristics.

The results are shown in FIG. 4. The 100% CA2 fuel has a HFRR wear scar diameter of about 550 microns. The 100% biodiesel has a HFRR wear scar diameter of about 549 microns. When the two fuels are blended at different proportions (i.e., 25%, 50%, or 75% of biodiesel fuel with the balance from the CA2 fuel), adding the traditional biofuel provides no or low improvement on lubricity values of the blends.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A blended fuel comprising:
   a) a petroleum fuel; and
   b) a low carbon fuel wherein the low carbon fuel is a hydrocarbon that has a well-to-wheels greenhouse gas content which is at least about 50% lower than a well-to-wheels greenhouse gas content of the petroleum fuel, and the low carbon fuel has a sulfur content of less than 5 ppm and a cetane number greater than 65; and
   wherein the blended fuel has a well-to-wheels greenhouse gas content which is at least 5% lower than the well-to-wheels greenhouse gas content of the petroleum fuel, and the blended fuel has at least two performance characteristic values selected from a group of performance characteristic values consisting of cetane number and sulfur content which are at least about 5% improved than corresponding performance characteristic values of the petroleum fuel, wherein the blended fuel is a non-ester hydrocarbon fuel that meets the specification of ASTM D975.

2. The blended fuel of claim 1, wherein the low carbon fuel is a renewable biomass feedstock-based fuel.

3. The blended fuel of claim 2, wherein the renewable biomass feedstock comprises one or more of the following: renewable plant material, waste material, animal fats, oils and greases.

4. The blended fuel of claim 3, wherein the low carbon fuel is a hydroprocessed renewable biomass feedstock-based fuel.

5. The blended fuel of claim 1, wherein the oxidative stability of the low carbon fuel is at least about 30% improved over the oxidative stability of the petroleum fuel, and wherein the oxidative stability of the blended fuel is at least about 5% improved over the oxidative stability of the petroleum fuel.

6. The blended fuel of claim 1, wherein the lubricity of the low carbon fuel is at least about 30% improved over the lubricity of the petroleum fuel, and wherein the lubricity of the blended fuel is at least about 5% improved over the lubricity of the petroleum fuel.

7. A process for producing a blended fuel comprising:
   a) hydroprocessing renewable biomass thereby converting it into a low carbon fuel;
   b) blending the low carbon fuel with a petroleum fuel wherein the low carbon fuel has a well-to-wheels greenhouse gas content which is at least about 50% lower than a well-to-wheels greenhouse gas content of the petroleum fuel, and the low carbon fuel has a sulfur content of less than 5 ppm and a cetane number greater than 65; and
   wherein the blended fuel has a well-to-wheels greenhouse gas content which is at least 5% lower than the well-to-wheels greenhouse gas content of the petroleum fuel, and the blended fuel has at least two performance characteristic values selected from a group of performance characteristic values consisting of cetane number and sulfur content which are at least about 5% improved than corresponding performance characteristic values of the petroleum fuel, wherein the blended fuel meets the specification of ASTM D975.

8. The process of claim 7, wherein the renewable biomass comprises one or more of the following: renewable plant material, waste material, animal fats, oils and greases.

9. The process of claim 7, wherein the renewable biomass is animal fats.

10. The process of claim 7, wherein the renewable biomass is oils or greases.

11. A blended fuel consisting essentially of:
    a) a petroleum fuel; and
    b) a low carbon fuel
    wherein the low carbon fuel is a hydrocarbon that has a well-to-wheels greenhouse gas content which is at least about 50% lower than a well-to-wheels greenhouse gas content of the petroleum fuel, and wherein the low carbon fuel has a sulfur content of less than 5 ppm and a cetane number greater than 65; and
    wherein the blended fuel has at least two performance characteristic values selected from a group of performance characteristic values consisting of cetane number and sulfur content which are at least about 5% improved than corresponding performance characteristic values of the petroleum fuel, wherein the blended fuel is a non-ester hydrocarbon fuel that meets the specification of ASTM D975.

12. The blended fuel of claim 11, wherein the low carbon fuel is a renewable biomass feedstock-based fuel.

13. The blended fuel of claim 12, wherein the renewable biomass feedstock is one or more of the following: renewable plant material, waste material, animal fats, oils and greases.

14. The blended fuel of claim 11, wherein the low carbon fuel is a hydroprocessed renewable biomass feedstock-based fuel.

15. The blended fuel of claim 11, wherein the oxidative stability of the low carbon fuel is at least about 30% improved over the oxidative stability of the petroleum fuel, and wherein the oxidative stability of the blended fuel is at least about 5% improved over the oxidative stability of the petroleum fuel.

16. The blended fuel of claim 11, wherein the lubricity of the low carbon fuel is at least about 30% improved over the lubricity of the petroleum fuel, and wherein the lubricity of the blended fuel is at least about 5% improved over the lubricity of the petroleum fuel.

17. The blended fuel of claim 14, wherein the renewable biomass feedstock is animal fats.

18. The blended fuel of claim 14, wherein the renewable biomass feedstock is oils or greases.

* * * * *